United States Patent
Jalan et al.

(10) Patent No.: US 9,838,472 B2
(45) Date of Patent: *Dec. 5, 2017

(54) VIRTUAL APPLICATION DELIVERY CHASSIS SYSTEM

(71) Applicant: A10 Networks, Inc., San Jose, CA (US)

(72) Inventors: Rajkumar Jalan, Saratoga, CA (US); Dennis Oshiba, Fremont, CA (US)

(73) Assignee: A10 NETWORKS, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/272,245

(22) Filed: Sep. 21, 2016

(65) Prior Publication Data

US 2017/0013051 A1 Jan. 12, 2017

Related U.S. Application Data

(63) Continuation of application No. 14/492,360, filed on Sep. 22, 2014, now Pat. No. 9,477,563, which is a (Continued)

(51) Int. Cl.
*G06F 15/16* (2006.01)
*H04L 29/08* (2006.01)
(Continued)

(52) U.S. Cl.
CPC ...... *H04L 67/1008* (2013.01); *G06F 9/45558* (2013.01); *G06F 9/5061* (2013.01);
(Continued)

(58) Field of Classification Search
CPC . H04L 67/1031; H04L 67/322; H04L 69/329; H04L 41/0668; H04L 41/5025;
(Continued)

(56) References Cited

U.S. PATENT DOCUMENTS 4,475,192 A 10/1984 Fernow et al.
5,042,032 A 8/1991 Dighe et al.
(Continued)

FOREIGN PATENT DOCUMENTS

CN 1554055 A 12/2004
CN 101019387 A 8/2007
(Continued)

OTHER PUBLICATIONS

Parekh et al., "A generalized processor sharing approach to flow control in integrated services networks: the single node case," IEEE/ACM Trans. Networking, pp. 344-357, Jun. 1993.
(Continued)

*Primary Examiner* — Jungwon Chang
(74) *Attorney, Agent, or Firm* — AMPACC Law Group LLP; Keith Kline

(57) ABSTRACT

A method for electing a master blade in a virtual application distribution chassis (VADC), includes: sending by each blade a VADC message to each of the other blades; determining by each blade that the VADC message was not received from the master blade within a predetermined period of time; in response, sending a master claim message including a blade priority by each blade to the other blades; determining by each blade whether any of the blade priorities obtained from the received master claim messages is higher than the blade priority of the receiving blade; in response to determining that none of the blade priorities obtained is higher, setting a status of a given receiving blade to a new master blade; and sending by the given receiving blade a second VADC message to the other blades indicating the status of the new master blade of the given receiving blade.

18 Claims, 7 Drawing Sheets

Related U.S. Application Data continuation of application No. 13/558,350, filed on Jul. 26, 2012, now Pat. No. 8,849,938, which is a continuation of application No. 13/363,055, filed on Jan. 31, 2012, now Pat. No. 8,266,235, which is a continuation of application No. 13/004,861, filed on Jan. 11, 2011, now abandoned.

(51) Int. Cl.

| | | |
|---|---|---|
| *G06F 9/50* | (2006.01) | |
| *G06F 11/20* | (2006.01) | |
| *G06F 9/455* | (2006.01) | |
| *H04L 12/931* | (2013.01) | |
| H04L 12/24 | (2006.01) | |
| G06F 11/14 | (2006.01) | |
| G06F 11/34 | (2006.01) | |

(52) U.S. Cl.
CPC .......... *G06F 11/2025* (2013.01); *H04L 49/70* (2013.01); *H04L 67/101* (2013.01); *H04L 67/1031* (2013.01); *H04L 67/1034* (2013.01); *H04L 67/322* (2013.01); *H04L 67/325* (2013.01); G06F 11/1469 (2013.01); G06F 11/3466 (2013.01); G06F 2009/45595 (2013.01); H04L 41/0668 (2013.01); H04L 67/1095 (2013.01)

(58) Field of Classification Search
CPC ............. H04L 67/1008; H04L 67/1095; H04L 67/101; H04L 67/325; H04L 67/1034; H04L 49/70; G06F 11/2028; G06F 11/181; G06F 11/1456; G06F 11/1469; G06F 11/3466; G06F 11/2025; G06F 9/4558; G06F 2009/45595
USPC ........ 370/219; 709/232, 226, 230, 224, 208; 714/4.11, 47.2; 713/300
See application file for complete search history.

(56) References Cited

U.S. PATENT DOCUMENTS

| | | | |
|---|---|---|---|
| 5,732,041 A | 3/1998 | Joffe | |
| 5,822,512 A | 10/1998 | Goodrum et al. | |
| 5,859,835 A | 1/1999 | Varma et al. | |
| 5,909,686 A | 6/1999 | Muller et al. | |
| 5,960,174 A | 9/1999 | Dew | |
| 6,047,000 A | 4/2000 | Tsang et al. | |
| 6,058,116 A | 5/2000 | Hiscock et al. | |
| 6,118,768 A | 9/2000 | Bhatia et al. | |
| 6,134,217 A | 10/2000 | Stiliadis et al. | |
| 6,314,501 B1 | 11/2001 | Gulick et al. | |
| 6,359,861 B1 | 3/2002 | Sui et al. | |
| 6,430,156 B1 | 8/2002 | Park et al. | |
| 6,438,134 B1 | 8/2002 | Chow et al. | |
| 6,470,016 B1 | 10/2002 | Kalkunte et al. | |
| 6,532,213 B1 | 3/2003 | Chiussi et al. | |
| 6,532,501 B1 | 3/2003 | McCracken | |
| 6,560,230 B1 | 5/2003 | Li et al. | |
| 6,577,596 B1 | 6/2003 | Olsson et al. | |
| 6,594,701 B1 | 7/2003 | Forin | |
| 6,650,641 B1 | 11/2003 | Albert et al. | |
| 6,654,374 B1 | 11/2003 | Fawaz et al. | |
| 6,674,721 B1 | 1/2004 | Dittia et al. | |
| 6,714,517 B1 | 3/2004 | Fawaz et al. | |
| 6,735,206 B1 | 5/2004 | Oki et al. | |
| 6,735,210 B1 | 5/2004 | Lindeborg et al. | |
| 6,765,915 B1 | 7/2004 | Metzger et al. | |
| 6,785,232 B1 | 8/2004 | Kotser et al. | |
| 6,813,268 B1 | 11/2004 | Kalkunte et al. | |
| 6,888,806 B1 | 5/2005 | Miller et al. | |
| 6,891,835 B2 | 5/2005 | Kalkunte et al. | |
| 6,892,309 B2 | 5/2005 | Richmond et al. | |
| 6,920,109 B2 | 7/2005 | Yazaki et al. | |
| 6,940,861 B2 | 9/2005 | Liu et al. | |
| 7,139,267 B2 | 11/2006 | Lu et al. | |
| 7,236,491 B2 | 6/2007 | Tsao et al. | |
| 7,353,259 B1 | 4/2008 | Bakke et al. | |
| 7,421,478 B1 | 9/2008 | Muchow | |
| 7,451,221 B2 | 11/2008 | Basani et al. | |
| 7,606,867 B1 | 10/2009 | Singhal et al. | |
| 7,627,672 B2 | 12/2009 | Lai et al. | |
| 7,660,824 B2 | 2/2010 | Halpern et al. | |
| 7,673,008 B2 | 3/2010 | Kojima | |
| 7,738,504 B1 | 6/2010 | Deaner et al. | |
| 7,849,178 B2 | 12/2010 | Shen et al. | |
| 7,949,893 B1 | 5/2011 | Knaus et al. | |
| 8,122,289 B2 | 2/2012 | Sargor et al. | |
| 8,266,235 B2 * | 9/2012 | Jalan .................. | H04L 67/1031 370/219 |
| 8,849,938 B2 * | 9/2014 | Jalan .................. | H04L 67/1031 370/219 |
| 8,897,154 B2 | 11/2014 | Jalan et al. | |
| 9,154,577 B2 | 10/2015 | Jalan et al. | |
| 9,477,563 B2 * | 10/2016 | Jalan .................... | H04L 67/322 |
| 2001/0043564 A1 | 11/2001 | Bloch et al. | |
| 2002/0012348 A1 | 1/2002 | Mizuhara et al. | |
| 2002/0071387 A1 | 6/2002 | Horiguchi et al. | |
| 2002/0075875 A1 | 6/2002 | Dravida et al. | |
| 2002/0131413 A1 | 9/2002 | Tsao et al. | |
| 2003/0023898 A1 | 1/2003 | Jacobs et al. | |
| 2003/0133406 A1 | 7/2003 | Fawaz et al. | |
| 2003/0135767 A1 * | 7/2003 | Chu .......................... | G06F 1/206 713/300 |
| 2003/0140132 A1 | 7/2003 | Champagne et al. | |
| 2003/0158886 A1 | 8/2003 | Walls et al. | |
| 2003/0169734 A1 | 9/2003 | Lu et al. | |
| 2003/0189947 A1 | 10/2003 | Beshai | |
| 2004/0024831 A1 | 2/2004 | Yang et al. | |
| 2004/0054780 A1 * | 3/2004 | Romero .............. | H04L 41/5025 709/226 |
| 2004/0059813 A1 | 3/2004 | Bolder et al. | |
| 2004/0228274 A1 | 11/2004 | Yazaki et al. | |
| 2004/0246980 A1 | 12/2004 | Balakrishnan | |
| 2004/0264481 A1 | 12/2004 | Darling et al. | |
| 2004/0268358 A1 | 12/2004 | Darling et al. | |
| 2005/0010709 A1 * | 1/2005 | Davies ................ | G06F 11/1456 710/305 |
| 2005/0163049 A1 | 7/2005 | Yazaki et al. | |
| 2005/0198359 A1 * | 9/2005 | Basani .................. | H04L 69/329 709/232 |
| 2005/0243856 A1 | 11/2005 | Mishra et al. | |
| 2006/0101372 A1 | 5/2006 | Zhuo et al. | |
| 2006/0104230 A1 | 5/2006 | Gidwani | |
| 2006/0123479 A1 | 6/2006 | Kumar et al. | |
| 2006/0164987 A1 | 7/2006 | Ruiz Floriach et al. | |
| 2006/0206594 A1 | 9/2006 | Brown et al. | |
| 2007/0081527 A1 | 4/2007 | Betker et al. | |
| 2007/0086428 A1 | 4/2007 | Lai et al. | |
| 2008/0104215 A1 | 5/2008 | Excoffier et al. | |
| 2009/0158081 A1 * | 6/2009 | Dake .................. | G06F 11/2028 714/3 |
| 2009/0204699 A1 | 8/2009 | Kortright | |
| 2010/0049836 A1 | 2/2010 | Kramer | |
| 2010/0094967 A1 | 4/2010 | Zuckerman et al. | |
| 2010/0162036 A1 * | 6/2010 | Linden ................. | G06F 11/181 714/4.11 |
| 2010/0180161 A1 * | 7/2010 | Kern ................... | G06F 11/2028 714/47.2 |
| 2011/0066672 A1 | 3/2011 | Zamarreno et al. | |
| 2011/0161405 A1 | 6/2011 | He | |
| 2012/0179770 A1 | 7/2012 | Jalan et al. | |
| 2012/0281540 A1 | 11/2012 | Khan et al. | |
| 2012/0297240 A1 | 11/2012 | Jalan et al. | |
| 2012/0311116 A1 | 12/2012 | Jalan et al. | |
| 2013/0151686 A1 | 6/2013 | Takaoka et al. | |
| 2015/0039674 A1 | 2/2015 | Agarwal et al. | |
| 2015/0195182 A1 | 7/2015 | Mathur et al. | |
| 2015/0312322 A1 | 10/2015 | Kamat et al. | |
| 2016/0020947 A1 | 1/2016 | Jalan et al. | |
| 2016/0062855 A1 | 3/2016 | Jalan et al. | |

(56) References Cited

U.S. PATENT DOCUMENTS

FOREIGN PATENT DOCUMENTS

| CN | 101252506 A | 8/2008 |
|---|---|---|
| CN | 101519078 A | 9/2009 |
| CN | 102708004 A | 10/2012 |
| CN | 102984194 A | 3/2013 |
| EP | 2663919 A2 | 11/2013 |
| HK | 1183571 A | 12/2013 |
| HK | 1186802 A | 3/2014 |
| JP | H06044090 A | 2/1994 |
| JP | 2002278787 A | 9/2002 |
| JP | 2003345640 A | 12/2003 |
| JP | 2007257023 A | 10/2007 |
| JP | 2009003923 A | 1/2009 |
| JP | 5948345 B2 | 7/2016 |
| TW | 542960 B | 7/2003 |
| TW | I233734 B | 6/2005 |
| TW | I277324 B | 3/2007 |
| WO | WO2010077222 A1 | 7/2010 |
| WO | WO2012097015 A2 | 7/2012 |
| WO | WO2012170226 A2 | 12/2012 |
| WO | WO2015164027 A1 | 10/2015 |

OTHER PUBLICATIONS

Bennett et al., "WF$^2$Q: Worst-case fair weighted fair queueing," Proc. IEEE Infocom '96, pp. 120-128 San Francisco, CA, Mar. 1996.

Golestani, S.J., "A self-clocked fair queueing scheme for broadband applications," Proc. Infocom '94, pp. 636-646, Jun. 1994.

Zhang, L. "Virtual Clock: A new traffic control algorithm for packet-switched networks," ACM Trans. on Computer Systems, vol. 9, No. 2, pp. 101-124, May 1991.

Shreedhar et al., "Efficient fair queuing using deficit round-robin," IEEE/ACM Trans. Networking, vol. 4, No. 3, pp. 375-385, Jun. 1996.

Stiliadis et al., "Efficient fair queueing algorithms for packet-switched networks," IEEE/ACM Trans. Networking, vol. 6, No. 2, pp. 175-185, Apr. 1998.

Suri et al., "Leap forward virtual clock: a new fair queuing scheme with guaranteed delays and throughput fairness," Proc. Infocom '97, pp. 557-565, Apr. 1997.

Stiliadis et al., "Latency-rate servers: a general model for analysis of traffic scheduling algorithms," IEEE/ACM Trans. Networking, vol. 6, No. 5, pp. 611-624, Oct. 1998.

Matsufuru et al. "Efficient fair queueing for ATM networks using uniform round robin," Proc. Infocom '99, pp. 389-397, Mar. 1999.

Katevenis et al., "Weighted round-robin cell mutliplexing in a general-purpose ATM switch chip," IEEE Journal on Selected Areas in Communication, vol. 9, No. 8, pp. 1265-1279, Oct. 1991.

Chaskar et al., "Fair scheduling with tunable latency: A Round Robin approach," IEEE Globecom '99, pp. 1328-1333, Dec. 1999.

Bennett et al., "High speed, scalable, and accurate implementation of packet fair queueing algorithms in ATM networks," Proc. ICNP '97, pp. 7-14, Oct. 1997.

Nageshwara Rao et al., "Concurrent access of priority queues," IEEE Trans. on Computers, vol. 37, No. 12, pp. 1657-1665, Dec. 1998.

Rexford et al., "Hardware-efficient fair queueing architectures for high-speed networks," Proc. Infocom '96, pp. 638-646, Mar. 1996.

\* cited by examiner

VIRTUAL APPLICATION DELIVERY CHASSIS SYSTEM

CROSS-REFERENCE TO RELATED APPLICATIONS

The present application is a continuation and claims the benefit of U.S. patent application Ser. No. 14/492,360, filed Sep. 22, 2014, entitled "Virtual Application Delivery Chassis System," which in turn is a continuation of U.S. patent application Ser. No. 13/558,350, filed Jul. 26, 2012, entitled "Virtual Application Delivery Chassis System," now issued on Sep. 30, 2014 as U.S. Pat. No. 8,849,938, which in turn is a continuation of U.S. patent application Ser. No. 13/363,055, filed on Jan. 31, 2012, entitled "Virtual Application Delivery Chassis System," now issued on Sep. 11, 2012 as U.S. Pat. No. 8,266,235, which in turn is a continuation of U.S. patent application Ser. No. 13/004,861, filed on Jan. 11, 2011, entitled "Virtual Application Delivery Chassis System," now abandoned. All of the above applications are incorporated herein by reference.

BACKGROUND OF THE INVENTION

Field

This invention relates generally to data communications, and more specifically, to a virtual application delivery chassis system.

Background

Web services and cloud computing are deployed in an unprecedented pace. New servers are unloaded and installed at data centers every day. Demands of web services and corporate computing come from all directions. Consumer oriented services include iPhone™ apps, mobile applications such as location based services, turn-by-turn navigation services, e-book services such as Kindle™, video applications such as YouTube™ or Hulu™, music applications such as Pandora™ or iTunes™, Internet television services such as Netflix™, and many other fast growing consumer Web services. On the corporate front, cloud computing based services such as Google™ docs, Microsoft™ Office Live and Sharepoint™ software, Salesforce.com™'s on-line software services, tele-presence and web conferencing services, and many other corporate cloud computing services.

As a result more and more servers are deployed to accommodate the increasing computing needs. These servers are typically managed by server load balancers (SLB) or application delivery controllers (ADC). ADC is typically a network appliance, such as A10 Network's AX-Series traffic manager. ADC manages the load balancing and delivery of service sessions from client host computers to servers based on incoming service requests. As more servers are deployed, more ADC's are deployed accordingly. Similarly as more servers are pooled together within a data center or spread across multiple data centers to provide a scalable solution for services, ADC's become a bottleneck.

BRIEF SUMMARY OF THE INVENTION

In one embodiment of the present invention, a method for electing a master blade in a virtual application distribution chassis, the virtual application distribution chassis comprising a plurality of blades, comprises: (a) sending by each blade of the plurality of blades a virtual application distribution chassis message to each of the other blades in the virtual application distribution chassis; (b) determining by each blade whether the virtual application distribution chassis message was received from the master blade within a predetermined period of time; (c) in response to determining that the virtual application distribution message was not received from the master blade within the predetermined period of time, sending a master claim message by each blade to each of the other blades in the virtual application distribution chassis, each master claim message comprising a blade priority for the sending blade; (d) determining by each blade receiving the master claim messages whether any of the blade priorities obtained from the received master claim messages is higher than the blade priority of the receiving blade; (e) in response to determining that by a given receiving blade that none of the blade priorities obtained from the received master claim messages is higher than the blade priority of the given receiving blade, setting a status of the given receiving blade to a new master blade; and (f) sending by the given receiving blade a second virtual application distribution chassis message to the other blades in the virtual application distribution chassis, the second virtual application distribution chassis message indicating the status of the new master blade of the given receiving blade.

In one aspect of the present invention, the plurality of blades comprises a master slave and one or more slave blades, wherein if the at least one slave blade is operating properly, the at least one slave blade sends the virtual application distribution chassis message to each of the other blades in the virtual application distribution chassis, and wherein if the master blade is operating properly, the master blade sends the virtual application distribution chassis message to each of the other blades in the virtual application distribution chassis.

In one aspect of the present invention, the plurality of blades comprises a master blade and one or more slave blades, where the determining (b) further comprises: (b1) determining by each blade whether the virtual application distribution chassis message was received from each slave blade of the virtual application distribution chassis within the predetermined period of time; (b2) in response to determining that the virtual application distribution chassis message was not received from a given slave blade within the predetermined period of time, marking the given slave blade as "failed" by each blade receiving the virtual application distribution messages; and (b3) in response to determining that the virtual application distribution chassis message was received from the given slave blade within the predetermined period of time, marking the given slave blade as properly operating by each blade receiving the virtual application distribution chassis messages.

In one aspect of the present invention, the determining (d) and the setting (e) comprises: (d1) comparing, by the given receiving blade, the blade priority obtained from a given master claim message with the blade priority of the given receiving blade; (e1) in response to determining that the blade priority of the given receiving blade is higher than the blade priority obtained from the given master claim message, repeating the comparing (d1) with another received master claim message; and (e2) in response to determining that the blade priority of the given receiving blade is higher than the blade priorities obtained from each of the other received master claim messages, setting the status of the given receiving blade to the new master blade.

In one aspect of the present invention, the determining (d) and the setting (e) comprise: (d1) comparing, by the given receiving blade, the blade priority obtained from a given master claim message with the blade priority of the given receiving blade; and (e1) in response to determining that the blade priority obtained from the given master claim message is higher than the blade priority of the given receiving blade, maintaining a slave status of the given receiving blade.

In one aspect of the present invention, each master claim message further comprises a blade identity of the sending blade, wherein the comparing (d1), the repeating (e1), and the setting (e2) comprises: (d1i) determining by the given receiving blade that the blade priority obtained from the given master claim message is equal to the blade priority of the given receiving blade; (d1ii) in response to determining that the blade priority obtained from the given master claim message is equal to the blade priority of the given receiving blade, determining whether the blade priority obtained from the given master claim message is numerically smaller than the blade priority of the given receiving blade; (e1i) in response to determining that the blade priority obtained from the given master claim message is numerically smaller than the blade priority of the given receiving blade, repeating the comparing (d1) with another received claim message; and (e2i) in response to determining that the blade priority of the given receiving blade is either higher than, or equal to and numerically smaller than, the blade priorities obtained from each of the other received master claim messages, setting the status of the given receiving blade to the new master blade.

In one aspect of the present invention, the sending (f) comprises: (f1) determining by a given slave blade of the plurality of blades whether the second virtual application distribution chassis message was received within a second predetermined period of time; and (f2) in response to determining by the given slave blade that the second virtual application distribution chassis message was not received within the second predetermined period of time, setting a status of the given slave blade to the new master blade and sending the second virtual application distribution message by the given slave blade to the other blades in the virtual application distribution chassis.

In one aspect of the present invention, the method further comprises: (g) adding a new blade to the virtual application distribution chassis; (h) sending a second master claim message by the new blade to each of the other blades in the virtual application distribution chassis; (i) in response to receiving the second master claim message from the new blade, determining by each of the other blades whether the master blade is marked as properly operating; and (j) in response to determining by each of the other blades that the master blade is marked as properly operating, ignoring the second master claim message, wherein otherwise, performing the sending (c), the determining (d), the setting (e), and the sending (f).

In one aspect of the present invention, the plurality of blades are operatively coupled as the virtual application distribution chassis within a data network, the data network comprising a network switch wherein the method further comprises: (g) assigning a first blade of the plurality of blades as an active blade to a virtual address, and assigning a second blade of the plurality of blades as a backup blade to the virtual address, wherein service requests destined for the virtual address are sent to the first blade by the network switch.

In one aspect of the present invention, the method further comprises: (h) determining by each blade that the virtual application distribution chassis message was not received from the first blade within the predetermined period of time; (i) in response to determining that the virtual application distribution chassis message was not received from the first blade within the predetermined period of time, changing a status of the second blade to the active blade for the virtual address; and (j) sending a virtual address change message to the network switch to inform the network switch to send future service requests destined for the virtual address to the second blade.

System and computer program products corresponding to the above-summarized methods are also described and claimed herein.

DETAILED DESCRIPTION OF THE INVENTION

Figure 1:
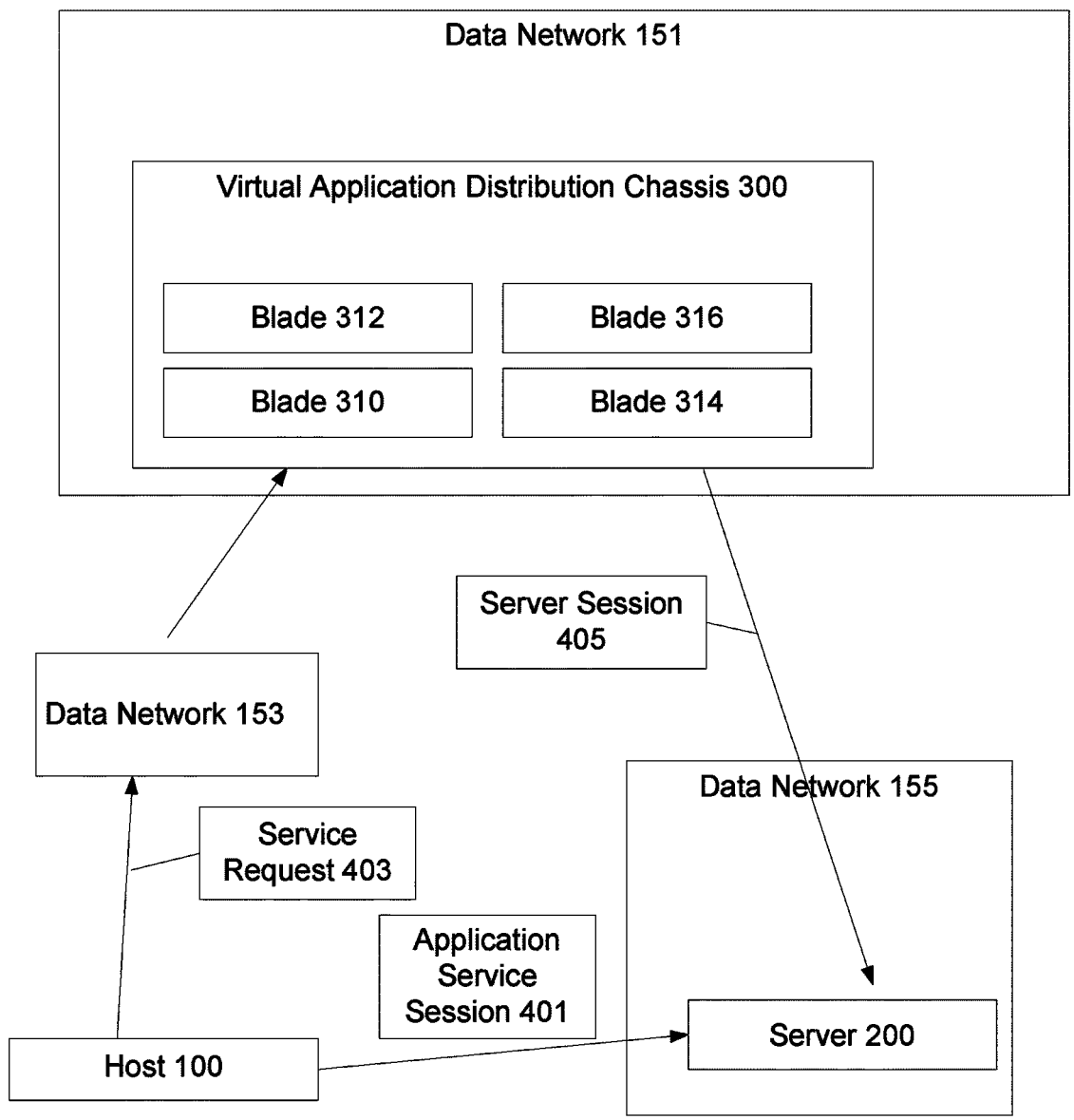
FIG. 1 illustrates a virtual application delivery chassis distributing a service session from a host to a server according to an embodiment of the present invention.

The following description is presented to enable one of ordinary skill in the art to make and use the invention and is provided in the context of a patent application and its requirements. Various modifications to the embodiment will be readily apparent to those skilled in the art and the generic principles herein may be applied to other embodiments. Thus, the present invention is not intended to be limited to the embodiment shown but is to be accorded the widest scope consistent with the principles and features described herein.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport eh program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, point devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The block diagrams in the Figures illustrate the architecture, functionality, and operation of possible implementations of systems, methods and computer program products according to various embodiments of the present invention. In this regard, each block in the block diagrams may represent a module, segment, or portion of code, which comprises one or more executable instructions for implementing the specified local function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams, and combinations of blocks in the block diagrams, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

FIG. 1 illustrates a virtual application delivery chassis 300 delivering an application service session 401 from a server 200 to host 100 according to an embodiment of the present invention. The virtual application delivery chassis 300 receives from host 100 a service request 403 of application service session 401 between host 100 and server 200. Service request 403 is delivered over a data network 153. In one embodiment, service session 401 is a Web service session and service request 403 is a Web service request such as a HTTP (Hypertext Transport Protocol) request, a secure HTTP request, a FTP (File Transfer Protocol) request, a file transfer request, an SIP (Session Initiation Protocol) session request, a request based on Web technology, a video or audio streaming request, a Web conferencing session request, or any request over the Internet or corporate network.

In one embodiment, service session 401 is a session for a non-Web service such as a remote access service, a file and print service, a name or directory service, an enterprise application service, a database application service or a messaging service. Service request 403 is a corresponding request of service session 401.

Figure 2:
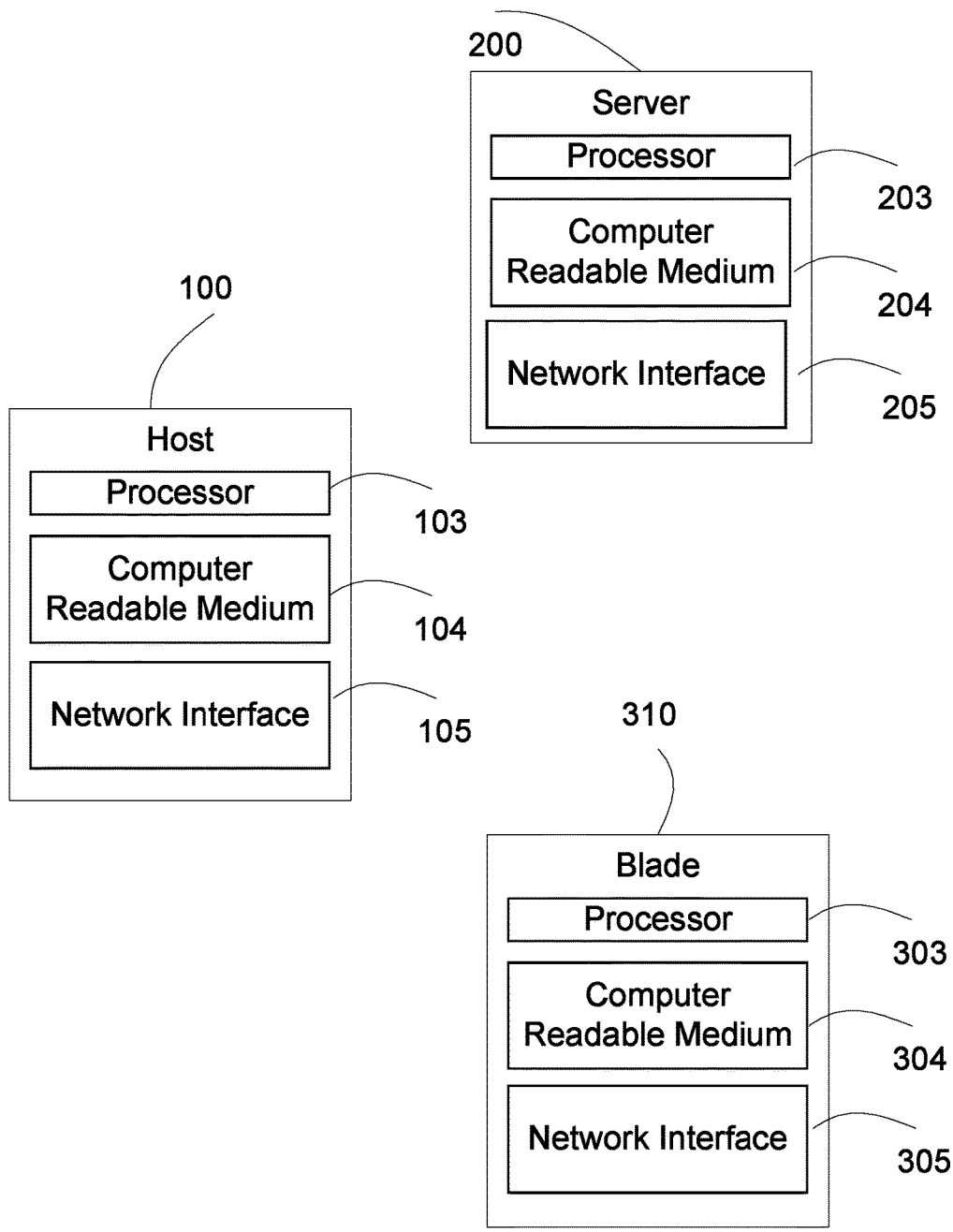
FIG. 2 illustrates components of an application delivery blade, a host and a server according to an embodiment of the present invention.

FIG. 2 illustrates components of an application delivery blade, a host, and a server according to an embodiment of the present invention. Host 100 is a computing device with network access capabilities. As shown in FIG. 2, the host 100 is operationally coupled to a processor 103, a computer readable medium 104 and a network interface 105. The computer readable medium 104 stores computer readable program code, which when executed by the processor 103, implements the various embodiments of the present invention as described herein. The network interface 105 connects to data network 153. Examples of network interface 105 include Ethernet, WiFi, mobile network interface, Bluetooth, WiMAX, digital subscriber line (DSL), cable interface, broadband network interfaces such as T1 or T3, optical network interfaces, wireless network interfaces or other data network interfaces. In one embodiment, host 100 is a workstation, a desktop personal computer or a laptop personal computer. In one embodiment, host 100 is a Personal Data Assistant (PDA), a smartphone, a tablet PC, or a cellular phone. In one embodiment, host 100 is a set-top box, an Internet media viewer, an Internet media player, a smart sensor, a smart medical device, a net-top box, a networked television set, a networked DVR, a networked Blu-ray player, or a media center.

In FIG. 1, the virtual application delivery chassis 300 includes a plurality of blades, such as blade 310, blade 312, blade 314 and blade 316. Each blade, for example blade 310, as illustrated in FIG. 2, is operationally coupled to a processor 303, a computer readable medium 304 and a network interface 305. The computer readable medium 304 stores computer readable program code, which when executed by the processor 303, implements the various embodiments of the present invention as described herein. In some embodiments, virtual application delivery chassis 300 is implemented to function as a server load balancer, an application delivery controller, a service delivery platform, a traffic manager, a security gateway, a component of a firewall system, a component of a virtual private network (VPN), a load balancer for video servers, or a service gateway to distribute load to a plurality of servers. The network interface 305 connects to data network 155. In FIG. 1, blades 310, 312, 314, 316 also connect to data network 151. The blades 310, 312, 314, 316 form virtual application delivery chassis 300 through their connections to the data network 151. In one embodiment, the network interface 305 includes various embodiments of the network interface 105. In one embodiment, the network interface 305 further includes an optical network interface.

Illustrated in FIG. 2, server 200 is operationally coupled to a processor 203, a computer readable medium 204 and a network interface 205. The computer readable medium 204 stores computer readable program code, which when executed by the processor 203, implements the various embodiments of the present invention as described herein. In some embodiments, the computer readable program code implements server 200 to function as a Web server, a file server, a video server, a database server, a messaging server, a file server, a printer server, an application server, a voice system, a conferencing server, a media megateway, a SIP server, a remote access server, a VPN server, or a media center. The network interface 205 connects to data network 155.

Back to FIG. 1, in one embodiment, data network 153 connects the host 100 and the virtual application delivery chassis 300. In one embodiment, data network 153 is an Internet Protocol (IP) network. In one embodiment, data network 153 is a corporate data network or a regional corporate data network, including but not limited to an intranet, a private network cloud, a virtual private network, or a campus area network. In one embodiment, data network 153 is an Internet service provider network. In one embodiment, data network 153 is a residential data network, including but not limited to a broadband network such as a DSL network, a cable network, or a personal area network. In one embodiment, data network 153 includes a wired network such as Ethernet. In one embodiment, data network 153 includes a wireless network such as a WiFi network, or cellular network. In one embodiment, the network interface 205 includes various embodiments of the network interface 105 and the network interface 305.

Data network 151 connects virtual application delivery chassis 300 to data network 153. In one embodiment, data network 151 includes various embodiments of data network 153. In one embodiment, data network 151 resides in a data center, spans across multiple data centers over a wide area network such as optical network, or spreads over multiple buildings in a campus area network.

Data network 155 connects the server 200 to data network 151. In one embodiment, data network 155 is a sub-network of data network 151. In one embodiment, data network 155 includes various embodiments of data network 151. In one embodiment, data network 155 is a different network from data network 155.

In an embodiment, the host 100 initiates an application service session 401 with the server 200. The host 100 sends a service request 403 to virtual application delivery chassis 300. After virtual application delivery chassis 300 receives service request 403, virtual application delivery chassis 300 establishes a server session 405 and relays service request 403 to the server 200. Virtual application delivery chassis 300 receives response through server session 405 from the server 200. Virtual application delivery chassis 300 subsequently relays the response through server session 405 as a response to service request 403.

Figure 3:
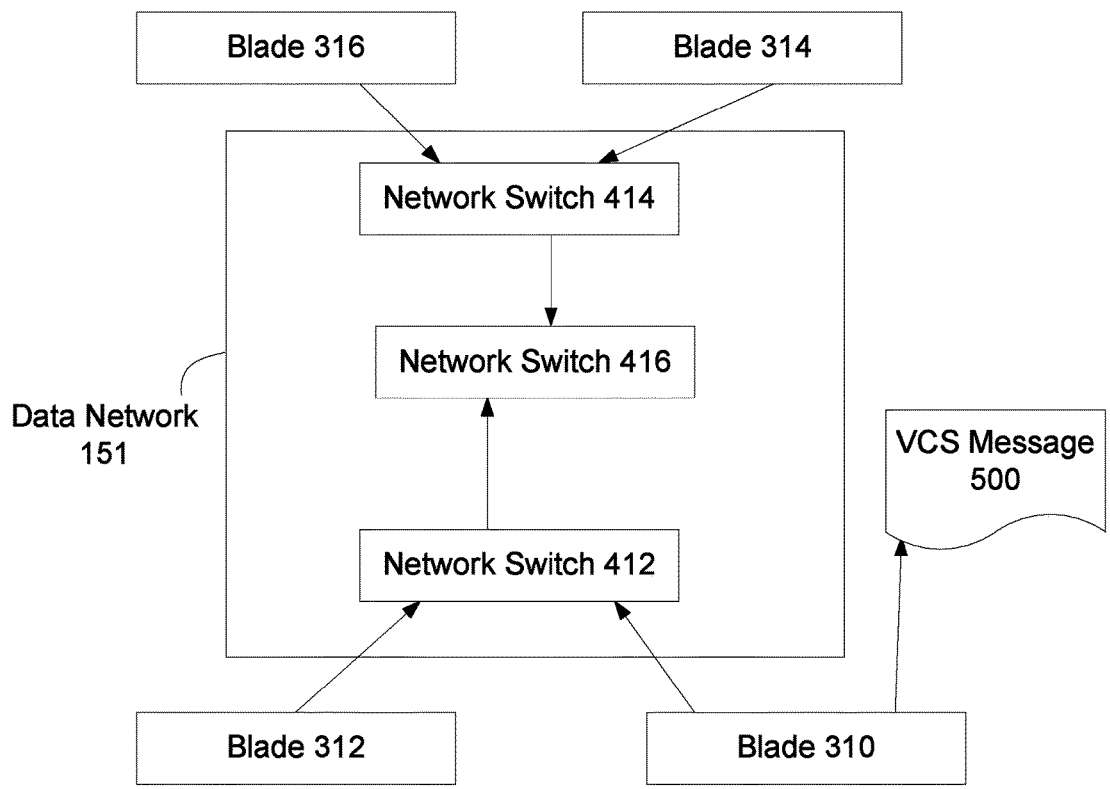
FIG. 3 illustrates connectivity of application delivery blades in the virtual application distribution chassis according to an embodiment of the present invention.

FIG. 3 illustrates connectivity of the blades of a virtual application delivery chassis according to an embodiment of the present invention. In a preferred embodiment, blade 310 is a piece of hardware separated from other blades. Blade 310 connects to other blades, such as blade 312, blade 314 and blade 316, over data network 151. In one embodiment, data network 151 includes a plurality of network switches such as switch 414, switch 412, and switch 416. Network switch 412 or network switch 414 is a networking device connecting a plurality of blades and other network switches. In one embodiment, switch 412 is an Ethernet switch, an IP router, an optical network switch, WAN network equipment, an ATM switch, a MPLS switch, a layer-2 network switch/hub/bridge, or a layer-3 network switch/router. In one embodiment as illustrated in FIG. 3, switch 412 connects blade 312, blade 310, and switch 416; switch 414 connects blades 314, blade 316, and switch 416. In this embodiment, blade 312 communicates with blade 310 using switch 412, and to blade 316 using switch 412, switch 416, and switch 414.

In one embodiment, switch 412, switch 414, and switch 416 are located in the same geographic location, such as a data center. In one embodiment, switch 412, switch 414, and switch 416 are located in different geographic locations, such as two or more data centers. In this embodiment, blades 310, 312, 314, and 316 are geographically located in different data centers.

Blade 310 communicates with other blades in the virtual application distribution chassis 300 by sending and receiving a virtual application delivery chassis message (VCS) 500. In one embodiment, blade 310 sends virtual application delivery chassis message 500 using a broadcast network address such as an Ethernet broadcast address. In one embodiment, the virtual application delivery chassis message 500 is sent using a multicast address such as an Ethernet multicast address, an IP multicast address, or other multicast network address. In one embodiment, blade 310 establishes a communication session (not shown) with blade 312 and sends virtual application delivery chassis message 500 to blade 312 using the communication session. Blade 310 also establishes separate communication sessions with the other blades in the virtual application distribution chassis 300 and sends virtual application delivery chassis message 500 to the other blades over their respective communication sessions. Examples of the communication session can be an UDP session, a TCP session, an IP-based communication session, a peer-to-peer communication session, a unicast communication session or other form of data communication session. In one embodiment, blade 310 receives virtual application delivery chassis message 500 using a broadcast, a multicast address, or a communication session with blade 312 or other blades in the virtual application distribution chassis 300.

Figure 4:
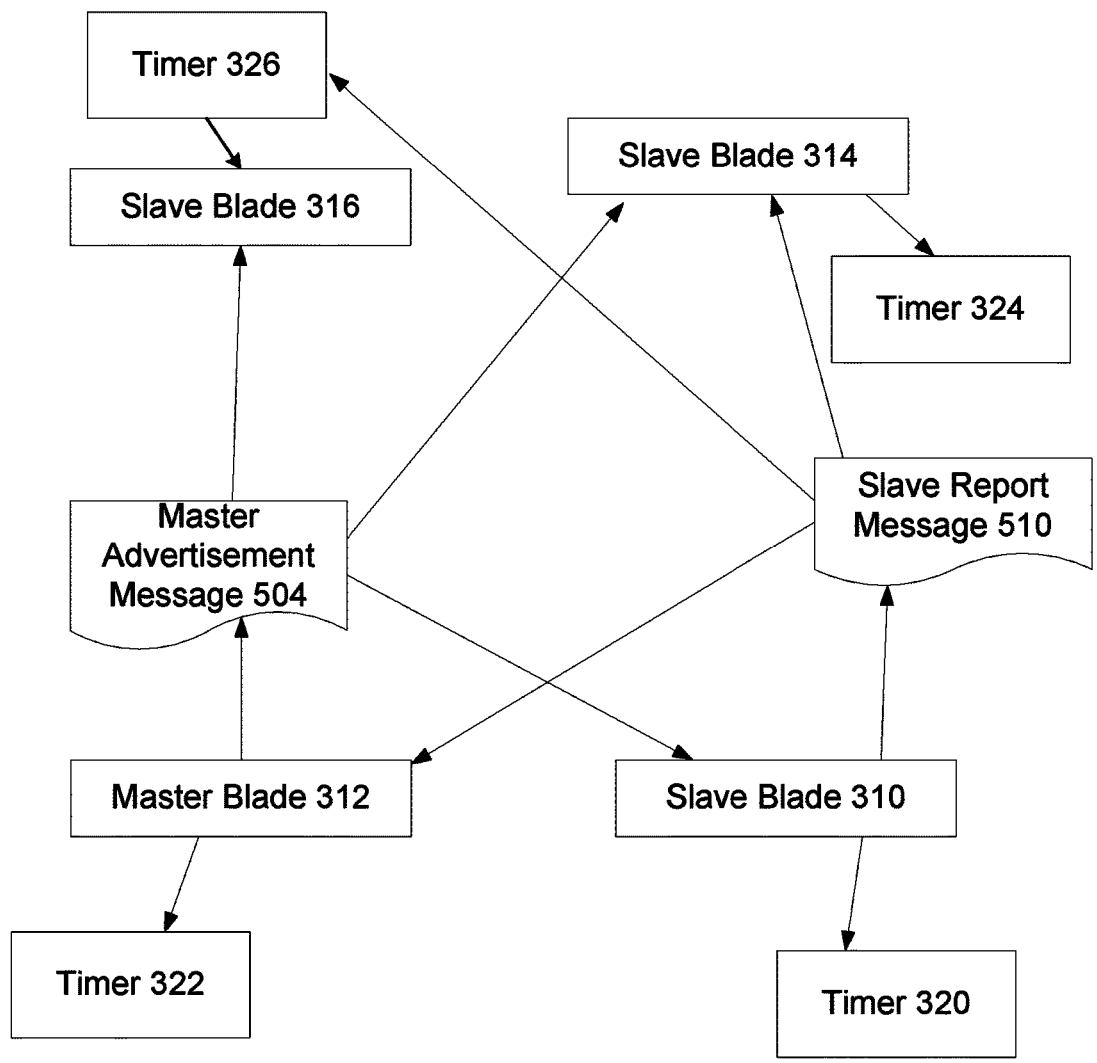
FIG. 4 illustrates the roles of blades in the virtual application distribution chassis according to an embodiment of the present invention.

FIG. 4 illustrates the roles of blades in the virtual application distribution chassis according to an embodiment of the present invention. Each blade is configured with either a master or slave role in virtual application delivery chassis 300, with only one blade configured with the master role. For example, assume that blade 312 is a master blade, blades 310, 314 and 316 are slave blades. Each slave blade, including slave blade 310, sends a slave report message 510 to the other blades in the virtual application distribution chassis 300. The slave report message 510 is a form of virtual application delivery chassis message 500. Receipt of the slave report message 510 itself from slave blade 310 indicates to the other blades that slave blade 310 is operating properly. Optionally slave report message 510 includes other information about blade 310, useful for functions outside the scope of the present invention. In an embodiment, slave blade 310 includes a timer 320. The timer 320 measures a pre-configured period of time. When the timer 320 expires, slave blade 310 sends slave report message 510 to the other blades in the virtual application distribution chassis 300. In one embodiment, slave blade 310 sends message 510 periodically every 30 seconds, 5 seconds, or 3 minutes. In one embodiment, slave blade 310 sends message 510 when there is a change of information in slave blade 310, such as changes to a software version due to an upgrade. In one embodiment, slave blade 310 sends message 510 when slave blade 310 receives a corresponding slave report message or master advertisement message 504 from another blade in the virtual application distribution chassis 300.

In an example illustrated in FIG. 4, slave blade 314 and master blade 312 receives slave report message 510 from slave blade 310. Contrary to including status indication within the slave report message 510, the receipt of the slave report message 510 itself indicates to slave blade 314 and master blade 312 that slave blade 310 is operating properly. Slave blade 314 and master blade 312 each marks slave blade 310 as being in proper running status. In one embodiment, slave blade 314 includes a timer 324. If slave blade 314 does not receive message 510 from slave blade 310 before the timer 324 expires, slave blade 314 considers slave blade 310 as "failed", i.e., not available to process service requests. Similarly master blade 312 considers slave blade 310 as "failed" if master blade 312 does not receive message 510 from slave blade 310 before timer 322 expires.

Master blade 312 sends out master advertisement message 504, another form of virtual application delivery chassis message 500, to inform the slave blades in the virtual application delivery chassis 300 that master blade 312 is running properly. In one embodiment, master blade 312 includes a timer 322 configured to measure a predetermined period of time, and sends master advertisement message 504 when the timer 322 expires. In one embodiment, master blade 312 sends master advertisement message 504 periodically, every half a second, 5 seconds, 30 seconds or 1 minute. In an embodiment, master blade 312 sends advertisement message 504 whenever there is a change of information of master blade 312, such as changes to a software version due to an upgrade.

In one embodiment, each slave blade, including slave blade 314, receives master advertisement message 504 from master blade 312. Contrary to including status indication within the master advertisement message 504, the receipt of the master advertisement message 504 itself indicates to the slave blades that master blade 312 is in proper running status. In the example illustrated in FIG. 4, when slave blade 314 receives the master advertisement message 504 before the timer 324 expires, slave blade 314 marks master blade 312 as running in normal operation. In an embodiment, if slave blade 314 does not receive master advertisement message 504 from master blade 312 before the timer 324 expires, slave blade 314 marks master blade 312 as "failed". In this case, slave blades 310 and 316 similarly do not receive the master advertisement message 504 from master blade 312 before their respective timers 320 and 326 expire, and mark master blade 312 as "failed".

Figure 5:
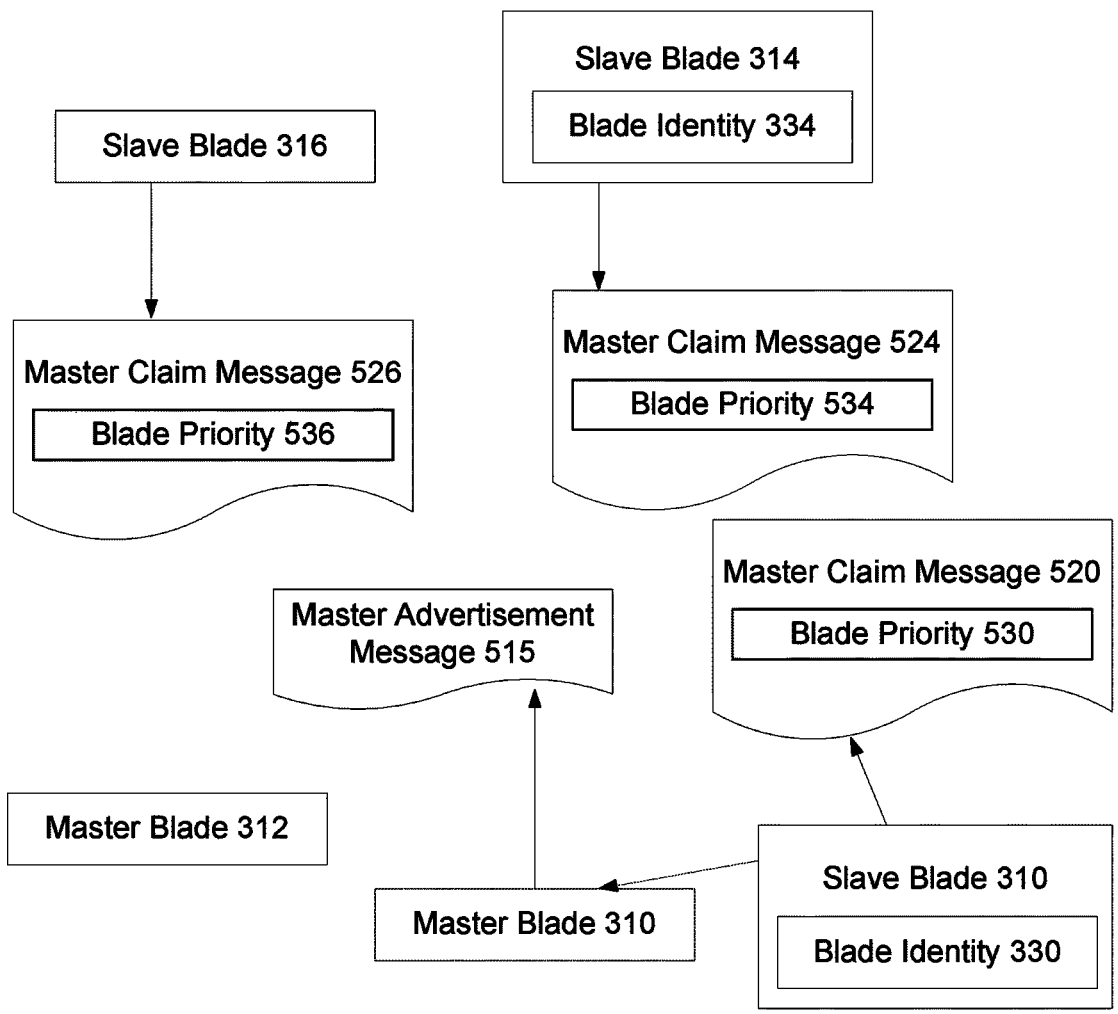
FIG. 5 illustrates a process to elect a master blade in the virtual application distribution chassis according to an embodiment of the present invention.

After the failure of master blade 312 is recognized by slave blades 310, 314, and 316, the slave blades will elect a new master blade. FIG. 5 illustrates a process to elect a master blade in the virtual application distribution chassis according to an embodiment of the present invention. In FIG. 5, slave blades 310, 314, and 316 each consider themselves eligible to become the new master blade. Each blade 310, 314, 316 sends a master claim message 520, 524, 526 to the other blades in the virtual application delivery chassis 300, where the master claim message includes a blade priority for the sending blade. The blade priorities are preconfigured and set forth the sequence of blades to be assigned a master role based on factors configurable by a chassis administrator. The master claim message is a form of virtual application delivery chassis message 500.

For example, in FIG. 5, slave blade 310 sends master claim message 520 containing its blade priority 530; slave blade 314 sends master claim message 524 containing its blade priority 534; slave blade 316 sends master claim message 526 containing its blade priority 536. Slave blade 314 receives master claim message 520 from slave blade 310 and obtains blade priority 530 from the master claim message 520. Slave blade 314 compares its own blade priority 534 to the blade priority 530 from the master claim message 520 and determines that blade priority 530 is higher than blade priority 534. In response, slave blade 314 maintains the role of a slave. Similarly slave blade 316 receives master claim message 520 from slave blade 310 and obtains blade priority 530 from the master claim message 520. Slave blade 316 compares its own blade priority 536 with the blade priority 530 from the master claim message 520 and determines that blade priority 530 is higher than its own blade priority 536. In response, slave blade 316 maintains the role of a slave.

Slave blade 310 receives master claim message 524 from slave blade 314 and obtains blade priority 534 from the master claim message 524. Slave blade 310 compares its own blade priority 530 with the blade priority 534 from the master claim message 524 and determines that blade priority 530 is higher than blade priority 534. Slave blade 310 also receives master claim message 526 from slave blade 316 and obtains blade priority 536 from the master claim message 526. Slave blade 310 compares its own blade priority 530 with the blade priority 536 and determines that blade priority 530 is higher than blade priority 536. In one embodiment, in response, slave blade 310 changes its role to master blade. In one embodiment, slave blade 310 includes the timer 320 and does not receive any master claim messages containing a blade priority higher than blade priority 530 before the timer 320 expires. In response, slave blade 310 changes its role to master blade. The new master blade 310 then informs the other blades in the virtual application distribution chassis 300 of its new master role by sending master advertisement message 515 to each of the other blades.

In one embodiment, slave blade 310 determines blade priority 530 equals blade priority 534. In response, slave blade 310 uses a pre-determined arbitration process to determine if slave blade 310 or slave blade 314 has a higher priority. For example, in one embodiment, slave blade 310 is assigned a blade identity 330. Slave blade 310 includes blade identity 330 in master claim message 520. Similarly slave blade 314 is assigned blade identity 334 and includes blade identity 334 in master claim message 524. Upon receiving master claim message 524, slave blade 310 compares the blade identity 334 from the master claim message 524 with its own blade identity 330 and determines that blade identity 334 is numerically smaller than blade identity 330. In response, slave blade 310 determines itself to have a higher priority than blade 314. Assuming slave blade 310 does not receive any other master claim messages with either a higher blade priority or an equal blade priority and a higher blade identity, slave blade 310 changes its role to master blade. In one embodiment, the pre-determined arbitration process prefers numerically smaller blade identities instead of higher blade identities. The pre-determined arbitration process may use information other than blade identity without departing from the spirit and scope of the present invention.

When the blade 310 changes its role to master blade, blade 310 sends a master advertisement message 515 to each of the other blades in the virtual application distribution chassis 300. The receipt of a master advertisement message 515 itself from blade 310 indicates to each of the other blades that blade 310 is a master blade. For example, when slave blade 314 receives master advertisement message 515 from master blade 310, slave blade 314 records that master blade 310 is the master blade of the virtual application delivery chassis 300.

In one embodiment, slave blade 314 includes a timer 324 and does not receive any master advertisement messages before the timer 324 expires. Slave blade 314 determines that a master blade has not been determined. In response, slave blade 314 elects itself to be the master blade and sends a master advertisement message to the other blades in the virtual application distribution chassis 300.

Figure 6:
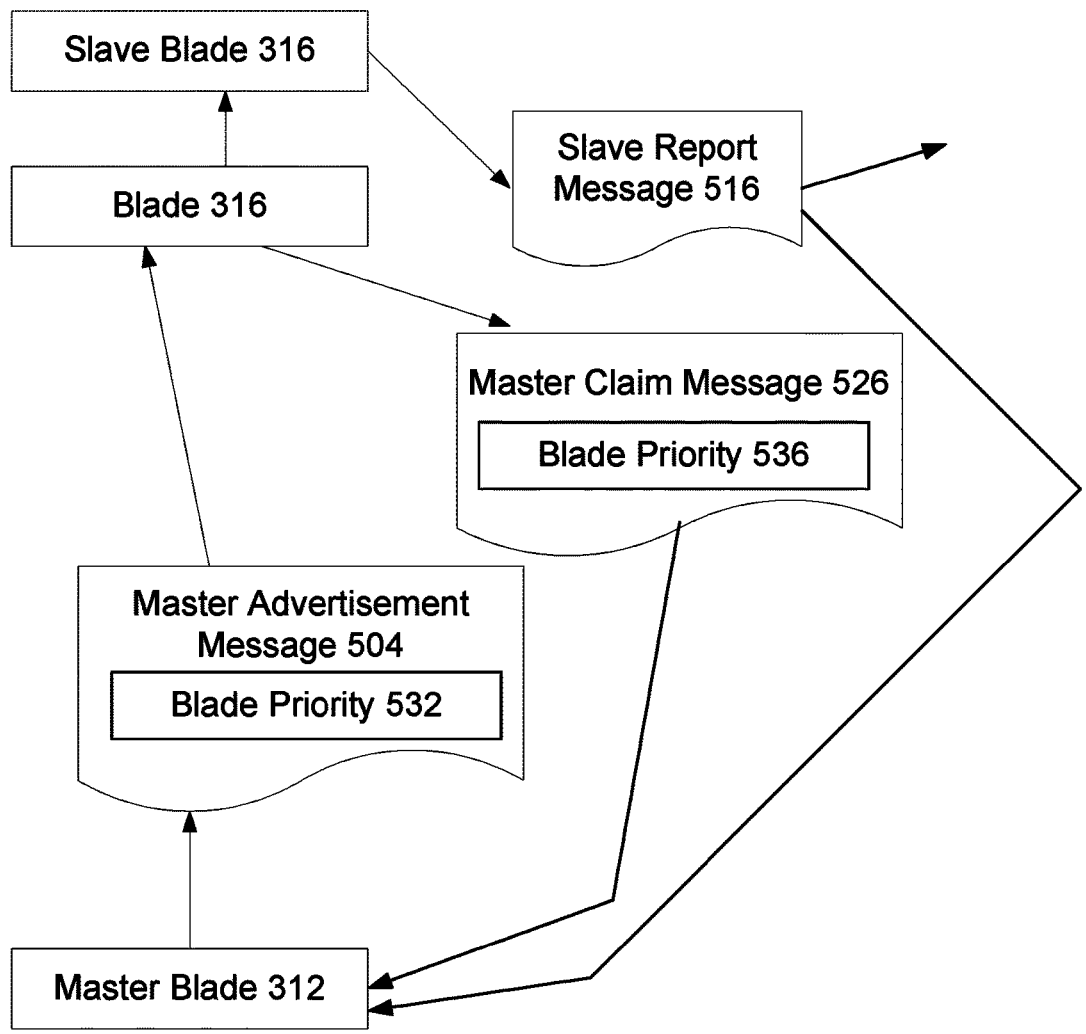
FIG. 6 illustrates a blade joining the virtual application distribution chassis according to an embodiment of the present invention.

FIG. 6 illustrates a process when a blade is added to a virtual application delivery chassis according to an embodiment of the present invention. Blade 316 is added to the virtual application delivery chassis 300, which has blade 312 as the master blade. Upon being added, blade 316 sends a master claim message 526 containing its blade priority 536. The other blades 310, 312, 314 in the virtual application delivery chassis 300 receive master claim message 526 from blade 316, determines that they are each in report mode (i.e., the master blade 312 is marked as properly in running status) and ignores the message 526. Master blade 312 sends out master advertisement message 504 upon the expiration of its timer 322 (FIG. 4). In one embodiment, master advertisement message 504 includes the blade priority 532 of the master blade 312. In response to receiving master advertisement message 504, blade 316 sets its role to a slave blade. The receipt of the master advertisement message 504 itself indicates to blade 316 that the virtual application distribution chassis 300 already has a properly running master blade.

Subsequently, upon the expiration of its timer 326 (FIG. 4), slave blade 316 sends out slave report message 516 to the other blades in the virtual application distribution chassis 300. The receipt of the slave report message 516 from the slave blade 316 by the other blades, including master blade 312, indicates that blade 316 has newly joined the virtual application delivery chassis 300, as described above with reference to FIG. 4. In this embodiment, the above described process may be used for adding a blade to an existing chassis or to a newly formed chassis. When forming a new virtual application distribution chassis, each blade that joins the chassis would send out a master claim message. Since there is not yet a master blade, i.e., none of the blades receives a master advertisement message before the expiration of its respective timers, the blades enter into the process of electing a master blade, as described above with reference to FIG. 5.

Figure 7:
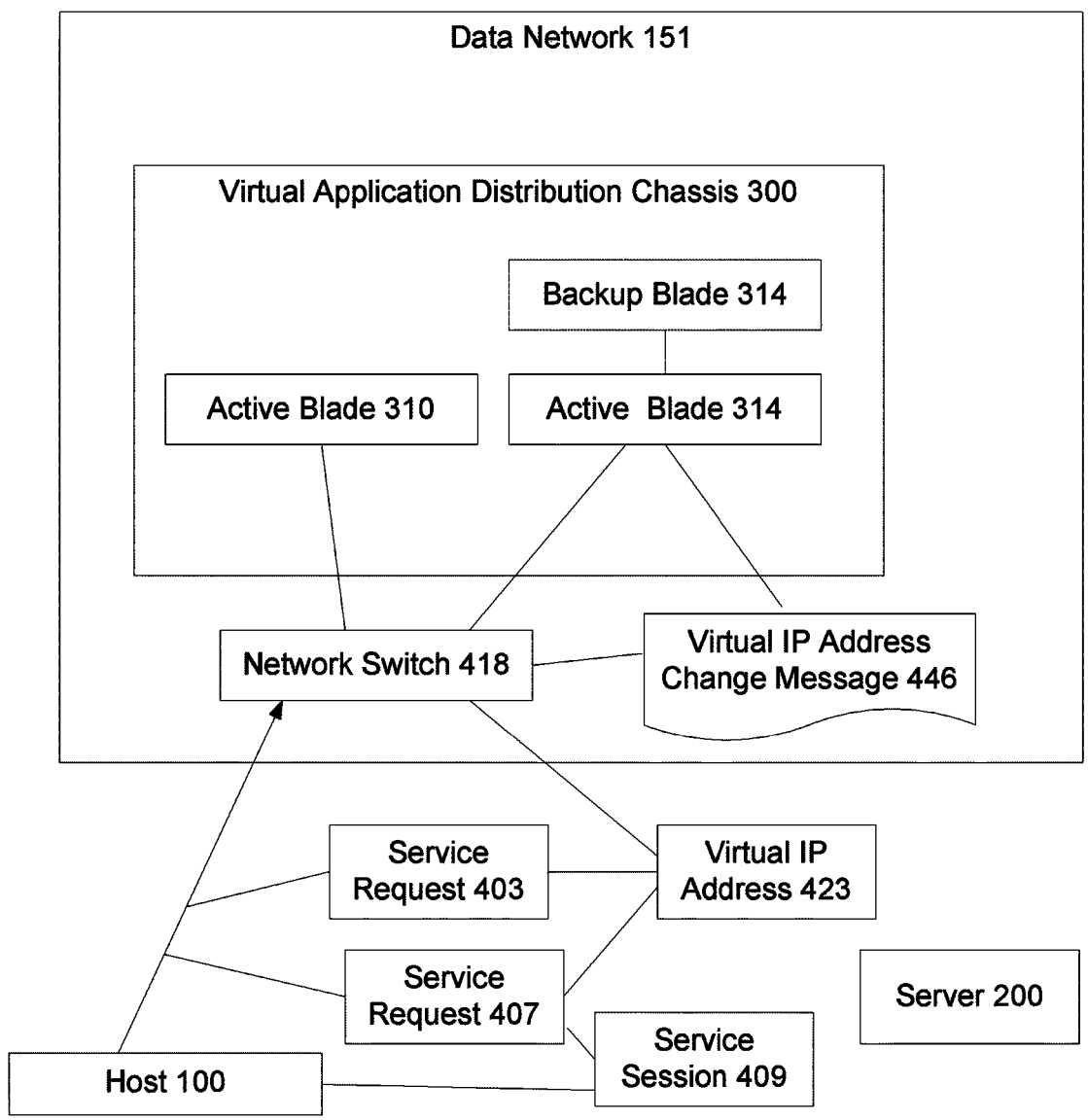
FIG. 7 illustrates service connectivity between virtual application delivery chassis and the host according to an embodiment of the present invention.

Revisiting the connectivity between virtual application delivery chassis 300 and the host 100, FIG. 7 illustrates the connectivity between host 100 and virtual application delivery chassis 300 according to an embodiment of the present invention. In this embodiment, the host 100 communicates with virtual application delivery chassis 300 through a network switch 418. Network switch 418 connects to blade 310 and blade 314. Virtual application delivery chassis 300 includes a virtual address 423. Virtual address 423 is a network address that the host 100 uses to communicate with virtual application delivery chassis 300. In one embodiment, virtual address 423 is an IP address, or other network address. Blade 310 is designated as an active blade for virtual address 423. Blade 314 is designated as a backup blade for virtual address 423. Thus, an active and backup blade in the virtual application distribution chassis 300 are designated for each virtual address of the data network 151. Network switch 418 delivers data packets destined for virtual address 423 to active blade 310. The host 100 sends service request 403 to virtual application delivery chassis 300 using virtual address 423. When network switch 418 receives service request 403 packet, network switch 418 sends the packet to active blade 310 destined for virtual address 423. Active blade 310 receives service request 403 and processes service request 403.

In one embodiment, active blade 310 fails and does not send slave report message 510, or master advertisement message if active blade 310 is a master blade, upon expiration of timer 320. Backup blade 314 does not receive slave report message 510 from active blade 310 before timer 324 expires. In response, backup blade 314 determines that active blade 310 has failed. Backup blade 314 changes its role to the active blade for virtual address 423. Active blade 314 sends a virtual address change message 446 to inform network switch 418 that future packets for virtual address 423 should be sent to active blade 314. In one embodiment, virtual address 423 is an IP address and network switch 418 is an Ethernet switch. Active blade 314 informs network switch 418 using an Address Resolution Protocol (ARP) message, which includes virtual address 423 and a MAC address of the network interface of active blade 314. Upon receiving the virtual address change message 446, network switch 418 changes state such that future packets destined for virtual address 423 will be sent to active blade 314.

In one embodiment, service session between the host 100 and the server 200 based on service request 403 fails when active blade 310 fails. In an embodiment, the host 100 subsequently sends service request 407 for another service session 409 using virtual address 423. Network switch 418 receives service request 407 and sends service request 407 with virtual address 423 to active blade 314. Active blade 314 processes service request 407 and sends the request to the server 200.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for electing a master blade in a virtual application distribution chassis, the virtual application distribution chassis comprising a plurality of blades, one of blades of the plurality of blades operating as the master blade and each of other blades of the plurality of blades operating as a slave blade, the method comprising:

sending by each blade of the plurality of blades a virtual application distribution chassis message to each of the other blades of the plurality of blades in the virtual application distribution chassis, the virtual application distribution chassis message including one of a slave report message communicated by each slave blade of the plurality of blades to the each of the other blades and a master advertisement message communicated by the master blade of the plurality of blades to the each of the other blades;

determining by each blade whether the virtual application distribution chassis message was received by each blade from the master blade within a predetermined period of time;

in response to determining that the virtual application distribution chassis message was not received by each blade from the master blade within the predetermined period of time, sending a master claim message by each blade to each of the other blades in the virtual application distribution chassis, each master claim message comprising a blade priority for the sending blade and a blade identity of the sending blade;

comparing, by a given receiving blade, the blade priority obtained from a first master claim message with the blade priority of the given receiving blade;

determining by the given receiving blade that the blade priority obtained from the first master claim message is equal to the blade priority of the given receiving blade;

in response to determining that the blade priority obtained from the first master claim message is equal to the blade priority of the given receiving blade, determining by the given receiving blade whether the blade identity obtained from the first master claim message is numerically smaller than the blade identity of the given receiving blade;

in response to determining that the blade identity from the first master claim message is numerically smaller than the blade identity of the given receiving blade, comparing, by the given receiving blade, the blade priority obtained from a second received master claim message with the blade priority of the given receiving blade; and in response to determining that the blade priority of the given receiving blade is either higher than, or the blade priority of the given receiving blade is equal to and the blade identity of the given receiving blade is numerically greater than, the blade priority and the blade identity obtained from the second received master claim message, setting by the given receiving blade the status of the given receiving blade to the new master blade; and sending by the given receiving blade a second virtual application distribution chassis message to the other blades in the virtual application distribution chassis, the second virtual application distribution chassis message indicating the status of the new master blade of the given receiving blade.

2. The method of claim 1,
wherein if the slave blade is operating properly, the slave blade sends the virtual application distribution chassis message to each of the other blades in the virtual application distribution chassis,
wherein if the master blade is operating properly, the master blade sends the virtual application distribution chassis message to each of the other blades in the virtual application distribution chassis.

3. The method of claim 1, wherein the determining by each blade whether the virtual application distribution chassis message was received from the master blade within a predetermined period of time further comprises:
determining by each blade whether the virtual application distribution chassis message was received from each slave blade of the virtual application distribution chassis within the predetermined period of time;
in response to determining that the virtual application distribution chassis message was not received from a given slave blade within the predetermined period of time, marking the given slave blade as "failed" by each blade receiving the virtual application distribution chassis message; and
in response to determining that the virtual application distribution chassis message was received from the given slave blade within the predetermined period of time, marking the given slave blade as properly operating by each blade receiving the virtual application distribution chassis message.

4. The method of claim 1, further comprising:
in response to determining that the blade priority obtained from the second received master claim message is higher than the blade priority of the given receiving blade, maintaining a slave status of the given receiving blade.

5. The method of claim 1, wherein the sending by the given receiving blade a second virtual application distribution chassis message comprises:
determining by a given slave blade of the plurality of blades whether the second virtual application distribution chassis message was received within a second predetermined period of time; and
in response to determining by the given slave blade that the second virtual application distribution chassis message was not received within the second predetermined period of time, setting a status of the given slave blade to the new master blade and sending the second virtual application distribution message by the given slave blade to the other blades in the virtual application distribution chassis.

6. The method of claim 1, further comprising:
adding a new blade to the virtual application distribution chassis;
sending a third master claim message by the new blade to each of the other blades in the virtual application distribution chassis;
in response to receiving the third master claim message from the new blade, determining by each of the other blades whether the master blade is marked as properly operating; and
in response to determining by each of the other blades that the master blade is marked as properly operating, ignoring the third master claim message.

7. A method for selecting a blade from a plurality of blades in a virtual application distribution chassis, the virtual application distribution chassis comprising a plurality of blades, one of blades of the plurality of blades operating as a master blade and each of other blades of the plurality of blades operating as a slave blade, the method comprising:
assigning a first blade of the plurality of blades as an active blade to a virtual address, and assigning a second blade of the plurality of blades as a backup blade to the virtual address, wherein the plurality of blades are operatively coupled as the virtual application distribution chassis within a data network, the data network comprising a network switch, wherein service requests destined for the virtual address are sent to the first blade by the network switch;
determining by each blade that a virtual application distribution chassis message was not received from the active blade within the predetermined period of time, the virtual application distribution chassis message including one of a slave report message communicated by each slave blade of the plurality of blades to the each of the other blades and a master advertisement message communicated by the master blade of the plurality of blades to the each of the other blades;
in response to determining that the virtual application distribution chassis message was not received from the active blade within the predetermined period of time, changing, by the second blade, a status of the second blade to the active blade for the virtual address;
sending, by the second blade, a virtual address change message to the network switch to inform the network switch to send future service requests destined for the virtual address to the second blade;
in response to determining that the first blade was previously designated as the master blade for the virtual application distribution chassis, sending a master claim message by each blade to each of the other blades in the virtual application distribution chassis, each master claim message comprising a blade priority for the sending blade;
determining by each blade receiving the master claim messages whether any of the blade priorities obtained from the received master claim messages is higher than the blade priority of the receiving blade;

in response to determining that by a given receiving blade that none of the blade priorities obtained from the received master claim messages is higher than the blade priority of the given receiving blade, setting, by the given receiving blade, a status of the given receiving blade to a new master blade;

sending by the given receiving blade a second virtual application distribution chassis message to the other blades in the virtual application distribution chassis, the second virtual application distribution chassis message indicating the status of the new master blade of the given receiving blade.

8. The method of claim 7,
wherein if the slave blade is operating properly, the slave blade sends the virtual application distribution chassis message to each of the other blades in the virtual application distribution chassis,
wherein if the master blade is operating properly, the master blade sends the virtual application distribution chassis message to each of the other blades in the virtual application distribution chassis.

9. The method of claim 7, further comprising:
in response to determining that the blade priority obtained from the given master claim message is higher than the blade priority of the given receiving blade, maintaining a slave status of the given receiving blade.

10. A system, comprising:
a plurality of blades operatively coupled as a virtual application distribution chassis within a data network, one of blades of the plurality of blades operating as a master blade and each of other blades of the plurality of blades operating as a slave blade, wherein each blade comprises a processor and a non-transitory computer readable storage medium having a computer readable program, the computer readable program when executed by the processor causes the plurality of blades to:
send by each blade of the plurality of blades a virtual application distribution chassis message to each of the other blades of the plurality of blades in the virtual application distribution chassis, the virtual application distribution chassis message including one of a slave report message communicated by each slave blade of the plurality of blades to the each of the other blades and a master advertisement message communicated by the master blade of the plurality of blades to the each of the other blades;
determine by each blade whether the virtual application distribution chassis message was received by each blade from the master blade within a predetermined period of time;
in response to determining that the virtual application distribution chassis message was not received by each blade from the master blade within the predetermined period of time, send a master claim message by each blade to each of the other blades in the virtual application distribution chassis, each master claim message comprising a blade priority for the sending blade and a blade identity of the sending blade;
compare, by a given receiving blade, the blade priority obtained from a first master claim message with the blade priority of the given receiving blade;
determine by the given receiving blade that the blade priority obtained from the first master claim message is equal to the blade priority of the given receiving blade;
in response to determining that the blade priority obtained from the first master claim message is equal to the blade priority of the given receiving blade, determine by the given receiving blade whether the blade identity obtained from the first master claim message is numerically smaller than the blade identity of the given receiving blade;
in response to determining that the blade identity from the first master claim message is numerically smaller than the blade identity of the given receiving blade, compare, by the given receiving blade, the blade priority obtained from a second received master claim message with the blade priority of the given receiving blade; and
in response to determining that the blade priority of the given receiving blade is either higher than, or the blade priority of the given receiving blade is equal to and the blade identity of the given receiving blade is numerically greater than, the blade priority and the blade identity obtained from the second received master claim message, set by the given receiving blade the status of the given receiving blade to the new master blade; and
send by the given receiving blade a second virtual application distribution chassis message to the other blades in the virtual application distribution chassis, the second virtual application distribution chassis message indicating the status of the new master blade of the given receiving blade.

11. The system of claim 10,
wherein if the slave blade is operating properly, the slave blade sends the virtual application distribution chassis message to each of the other blades in the virtual application distribution chassis,
wherein if the master blade is operating properly, the master blade sends the virtual application distribution chassis message to each of the other blades in the virtual application distribution chassis.

12. The system of claim 10, wherein the determine by each blade whether the virtual application distribution chassis message was received from the master blade within a predetermined period of time further comprises:
determine by each blade whether the virtual application distribution chassis message was received from each slave blade of the virtual application distribution chassis within the predetermined period of time;
in response to determining that the virtual application distribution chassis message was not received from a given slave blade within the predetermined period of time, mark the given slave blade as "failed" by each blade receiving the virtual application distribution chassis message; and
in response to determining that the virtual application distribution chassis message was received from the given slave blade within the predetermined period of time, mark the given slave blade as properly operating by each blade receiving the virtual application distribution chassis message.

13. The system of claim 10, further comprising:
in response to determining that the blade priority obtained from the second received master claim message is higher than the blade priority of the given receiving blade, maintain a slave status of the given receiving blade.

14. The system of claim 10, wherein the send by the given receiving blade a second virtual application distribution chassis message comprises:
determine by a given slave blade of the plurality of blades whether the second virtual application distribution chassis message was received within a second predetermined period of time; and in response to determining by the given slave blade that the second virtual application distribution chassis message was not received within the second predetermined period of time, set a status of the given slave blade to the new master blade and sending the second virtual application distribution message by the given slave blade to the other blades in the virtual application distribution chassis.

15. The system of claim 10, further comprising:

add a new blade to the virtual application distribution chassis;

send a third master claim message by the new blade to each of the other blades in the virtual application distribution chassis;

in response to receiving the third master claim message from the new blade, determine by each of the other blades whether the master blade is marked as properly operating; and in response to determining by each of the other blades that the master blade is marked as properly operating, ignore the third master claim message.

16. A system, comprising:

a plurality of blades operatively coupled as a virtual application distribution chassis within a data network, one of blades of the plurality of blades operating as the master blade and each of other blades of the plurality of blades operating as a slave blade, wherein each blade comprises a processor and a non-transitory computer readable storage medium having a computer readable program, the computer readable program when executed by the processor causes the plurality of blades to:

assign a first blade of the plurality of blades as an active blade to a virtual address, and assign a second blade of the plurality of blades as a backup blade to the virtual address, wherein the plurality of blades are operatively coupled as the virtual application distribution chassis within a data network, the data network comprising a network switch, wherein service requests destined for the virtual address are sent to the first blade by the network switch;

determine by each blade that a virtual application distribution chassis message was not received from the active blade within the predetermined period of time, the virtual application distribution chassis message including one of a slave report message communicated by each slave blade of the plurality of blades to the each of the other blades and a master advertisement message communicated by the master blade of the plurality of blades to the each of the other blades;

in response to determining that the virtual application distribution chassis message was not received from the active blade within the predetermined period of time, change by the second blade a status of the second blade to the active blade for the virtual address;

send by the second blade a virtual address change message to the network switch to inform the network switch to send future service requests destined for the virtual address to the second blade;

in response to determining that the first blade was previously designated as the master blade for the virtual application distribution chassis, send a master claim message by each blade to each of the other blades in the virtual application distribution chassis, each master claim message comprising a blade priority for the sending blade;

determine by each blade receiving the master claim messages whether any of the blade priorities obtained from the received master claim messages is higher than the blade priority of the receiving blade;

in response to determining by a given receiving blade that none of the blade priorities obtained from the received master claim messages is higher than the blade priority of the given receiving blade, set by the given receiving blade a status of the given receiving blade to a new master blade;

send by the given receiving blade a second virtual application distribution chassis message to the other blades in the virtual application distribution chassis, the second virtual application distribution chassis message indicating the status of the new master blade of the given receiving blade.

17. The system of claim 16, wherein if the slave blade is operating properly, the slave blade sends the virtual application distribution chassis message to each of the other blades in the virtual application distribution chassis, wherein if the master blade is operating properly, the master blade sends the virtual application distribution chassis message to each of the other blades in the virtual application distribution chassis.

18. The system of claim 16, further comprising:

in response to determining that the blade priority obtained from the given master claim message is higher than the blade priority of the given receiving blade, maintaining a slave status of the given receiving blade.

* * * * *